United States Patent
Zhang

(10) Patent No.: US 9,937,851 B2
(45) Date of Patent: Apr. 10, 2018

(54) DEVICE FOR ADJUSTING HIGH AND LOW BEAM SHAPE OF AUTOMOTIVE HEADLAMP

(71) Applicant: SHANGHAI KOITO AUTOMOTIVE LAMP CO., LTD, Shanghai (CN)

(72) Inventor: Jie Zhang, Shanghai (CN)

(73) Assignee: SHANGHAI KOITO AUTOMOTIVE LAMP CO., LTD, Shanghai (CN)

( * ) Notice: Subject to any disclaimer, the term of this patent is extended or adjusted under 35 U.S.C. 154(b) by 0 days.

(21) Appl. No.: 15/310,941

(22) PCT Filed: Apr. 24, 2015

(86) PCT No.: PCT/CN2015/077369
§ 371 (c)(1),
(2) Date: Nov. 14, 2016

(87) PCT Pub. No.: WO2015/180546
PCT Pub. Date: Dec. 3, 2015

(65) Prior Publication Data
US 2017/0080847 A1     Mar. 23, 2017

(30) Foreign Application Priority Data

May 26, 2014 (CN) .......................... 2014 1 0226360
May 26, 2014 (CN) .......................... 2014 2 0273534

(51) Int. Cl.
| | |
|---|---|
| *F21V 19/02* | (2006.01) |
| *F21V 21/14* | (2006.01) |
| *B60Q 1/068* | (2006.01) |
| *F21S 8/10* | (2006.01) |

(52) U.S. Cl.
CPC .......... *B60Q 1/0683* (2013.01); *F21S 48/212* (2013.01); *F21S 48/215* (2013.01); *F21S 48/2206* (2013.01); *F21S 48/2237* (2013.01); *F21S 48/2262* (2013.01); *F21S 48/2287* (2013.01); *B60Q 2200/36* (2013.01); *F21S 48/328* (2013.01)

(58) Field of Classification Search
CPC .... B60Q 1/0683; B60Q 2200/36; B60Q 1/06; B60Q 1/15; F21S 48/2287; F21S 48/2262; F21S 48/2237; F21S 48/215; F21S 48/212; F21S 48/2206; F21S 48/328
USPC ................................. 362/524, 523, 528, 460
See application file for complete search history.

(56) References Cited

U.S. PATENT DOCUMENTS

2005/0262954 A1* 12/2005 Eto .................. B60Q 1/076
  74/89.36
2008/0019140 A1*  1/2008 Flynn ............... B60Q 1/0683
  362/524

* cited by examiner

*Primary Examiner* — Anh Mai
*Assistant Examiner* — Glenn Zimmerman
(74) *Attorney, Agent, or Firm* — CBM Patent Consulting, LLC

(57) ABSTRACT

A device for adjusting high and low beam shape of automotive headlamp comprising a fixed bracket, an adjusted assembly and an up/down and left/right adjusting mechanism. The low beam unit is disposed on the fixed bracket and the high beam unit is disposed on the adjusted assembly. The cylindrical inner hole disposed on the fixed bracket is fitted with the fixed ball head disposed on the adjusted assembly, whereas the elastic waist hole slot disposed on the fixed bracket is fitted with the adjusting bar disposed on the adjusted assembly.

6 Claims, 5 Drawing Sheets

DEVICE FOR ADJUSTING HIGH AND LOW BEAM SHAPE OF AUTOMOTIVE HEADLAMP

This application is the U.S. national phase of International Application No. PCT/CN2015/077369 Filed on 24 Apr. 2015 which designated the U.S. and claims priority to Chinese Application Nos. CN 201410226360.3 and CN 201420273534.7 filed on 26 May 2014, the entire contents of each of which are hereby incorporated by reference.

TECHNICAL FIELD

This invention relates automotive headlamp technology field, especially a device for adjusting beam angle in automotive headlamp, specifically, the invention relates to a device for adjusting high and low beam shape of automotive headlamp.

BACKGROUND TECHNOLOGY

Mainly used for night driving, automotive headlamps provide the best visual effect for the driver in the process, which requires the lamps to have excellent lighting effects. With both headlamps on for lighting, the lamps should possess the property to enable the driver to watch traffic obstacles clearly within 100 meters ahead, with the beam at the forward direction and the direction of principal optic axis being lower. The condition of high and low beam shape and irradiation direction play an important role in safe night driving, because in the actual traffic environment, when two cars in the opposite directions encounter, the headlamp's glare may cause the driver to dazzle, which may be at risk of traffic accidents. At present the major solution to this is to switch between the high and low beam, that is, to use different headlamps according to different situations to unify the contradictions mentioned above.

Since the irradiation direction and relative position of high and low beam have fixed requirement, to adjust the product into consistency, an economical and practical adjusting device for automotive lamp manufacturers should be needed. Currently to adjust the relative position of high light of high beam shape to low beam shape, the common method is to separately dispose the high beam unit and low beam unit to independent brackets, each of which is disposed with a fixed fulcrum structure relative to lamp body as well as two adjustable points that can adjust along forward and backward direction. In this way, the adjustment to the relative position of the high light of the high beam shape to the low beam shape is implemented by separately adjusting the beam angle of high and low beam, which incorporates the principle that three non-collinear points determine a plane.

The deficiency of this method lies in the large-scale space, because each of the high beam unit and the low beam unit has a fixed bracket disposed with fixed fulcrum as well as two adjustable points that can adjust along forward and backward direction, among which the distance is above 80 mm to one another.

Another deficiency is that to meet the lawful requirement for beam angle of low beam, the low beam unit must be adjusted in upward, downward, leftward and rightward angles after the automotive headlamp is disposed on the automotive frame. After the beam angle of low beam unit has been adjusted, the high light of high beam shape will deviate from low beam shape because high beam unit and low beam unit belong to different brackets and adjustment systems.

INVENTION CONTENT (SUMMARY OF THE INVENTION)

The purpose of this invention is to provide a device for adjusting high and low beam shape of automotive headlamp. In this adjusting device, the low beam unit is disposed on the fixed bracket, and the high beam unit is disposed on the adjusted assembly which can be adjusted by the up/down and left/right adjusting mechanism to rotate upward, downward, leftward or rightward, so as to implement the adjustment of the high and low beam shapes, thereby the problem of the existing adjusting device that the high light of the high beam light shape will deviate from the low beam shape after the beam angle of the low beam unit is adjusted, which is caused by the high beam unit and the low beam unit being disposed in different brackets and adjustment systems, occupying large-scale space.

To achieve the aforementioned purpose, the scheme of this invention is a device for adjusting high and low beam shape of automotive headlamp, comprising a fixed bracket, an adjusted assembly and an adjusting mechanism, where the fixed bracket is fixedly connected to the low beam unit and the adjusted assembly is fixedly connected to high beam unit.

One end of the aforesaid adjusted assembly is disposed an adjusting bar, and the other end of the aforesaid adjusted assembly is fixedly disposed a guide post on both sides, between which is fixedly disposed a cylindrical inner hole; on the aforesaid fixed bracket is disposed elastic waist hole slots fitted with the corresponding guide posts, between which is disposed the fixed ball head fitted with the aforesaid cylindrical inner hole; when the ends of two guide posts are respectively in the corresponding elastic waist hole slots, the deviation of the adjusted assembly along the rotation of the cylindrical inner hole is restricted; when the fixing ball head is in the cylindrical inner hole, the deviation of the adjusted assembly along the radial direction of the cylindrical inner hole is restrained.

The aforesaid adjusting mechanism is an up/down and left/right adjusting mechanism. On the one side is disposed a through hole fitted with the end (spherical) of the adjusting bar. Through the adjustment of the adjusting mechanism to the adjusting bar, the adjusted assembly is driven to rotate around the sphere center of the fixing ball head upward, downward, leftward or rightward relative to the fixed bracket.

According to the device for adjusting high and low beam shape of automotive headlamp in this invention, to be specific, the aforesaid up/down and left/right adjusting mechanism is a thread-driven bi-directional adjusting mechanism.

According to the device for adjusting high and low beam shape of automotive headlamp in this invention, to be specific, the aforesaid thread-driven bi-directional adjusting mechanism consists of a sliding block with cavity, a gear, an up/down adjusting bolt and a left/right adjusting bolt. In the cavity of the sliding block sets a rack structure meshing with one side of the gear, of which the other side meshes with the left/right bolt. With the aforesaid through hole set in the center of the gear, the left/right bolt is adjusted by fitting the through hole with the adjusting bar to drive the gear to roll along the rack structure, so as to implement the leftward and rightward adjustment to the adjusted assembly.

On the aforesaid fixed bracket is disposed a sliding chute, within which there sets the aforesaid fitted with the sliding block. On the one side of the sliding block is disposed a half-threaded structure forming a thread pair together with the up/down adjusting bolt on the same side, disposed on the top of which the groove cuts in the upper edge of the aforesaid sliding chute, to make the up/down adjusting bolt relatively axially fixed with the sliding chute. The up/down adjusting bolt is adjusted by fitting the aforesaid through hole with the adjusting bar to drive the sliding block, gear and left/right adjusting bolt to move upward and downward in the sliding chute, so as to implement the upward and downward adjustment to the adjusted assembly.

According to the device for adjusting high and low beam shape of automotive headlamp in this invention, to be specific, the aforesaid guide post is cylindrical.

According to the device for adjusting high and low beam shape of automotive headlamp in this invention, to be specific, the aforesaid sliding chute is a vented-box sliding chute.

According to the device for adjusting high and low beam shape of automotive headlamp in this invention, to be specific, the aforesaid adjusting bar is disposed horizontally or is upward inclined relative to the horizontal plane.

According to the device for adjusting high and low beam shape of automotive headlamp in this invention, to be specific, the adjusting bar is angled up by 15 to 20 degree relative to the horizontal plane.

The beneficial effects achieved by this invention: this invention disposes the high beam unit on the adjusted assembly and the low beam unit on the fixed bracket; the deviation of the adjusted assembly along the radial direction of the cylindrical inner hole is restrained by fitting the fixed ball head on the fixed bracket with the cylindrical inner hole on the adjusted assembly; the deviation of the adjusted assembly along the rotation of the cylindrical inner hole is restricted by fitting the two elastic waist hole slots on the fixed bracket with the two guide posts on the adjusted assembly; the upward, downward, leftward and rightward adjustment of the adjusted assembly relative to the fixed bracket is implemented through the adjustment of the adjusting mechanism to the adjusting bar. Having a compact structure, this adjusting device achieves the simultaneous adjustment to the high and low beam shapes, and solves the problem of the existing adjusting device that the high light of the high beam shape will deviate from the low beam shape after the beam angle of the low beam unit is adjusted, because the high beam unit and the low beam unit are disposed in different brackets and adjustment systems in the large-scale space.

SPECIFIC EMBODIMENT

Next, this invention will be further explained in detail by combining with the figures.

Figure 1:
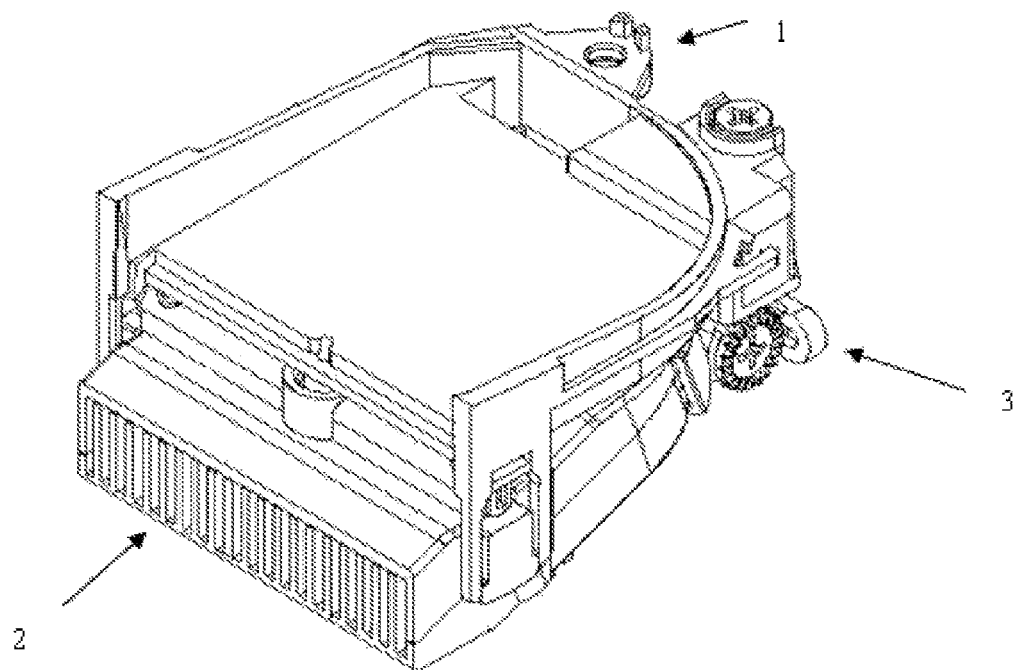
FIG. 1 is the overall structural diagram of the adjusting device in this invention.

As shown in FIG. 1, 1 is the fixed bracket, 2 is the adjusted assembly and 3 is the adjusting mechanism.

The device for adjusting high and low beam shape of automotive headlamp in this invention comprises the fixed bracket 1, the adjusted assembly 2 and the adjusting mechanism 3. The aforesaid fixed bracket 1 is fixedly connected with the low beam unit, and the aforesaid adjusted assembly is fixedly connected with the high beam unit. The adjustment to the relative position of the high light of the high beam unit to low beam shape is implemented through the adjusting mechanism's adjustment to the adjusted assembly, and then the simultaneous adjustment to the high and low beam shapes is implemented by adjusting the angle of the fixed bracket and lamp body.

Figure 2:
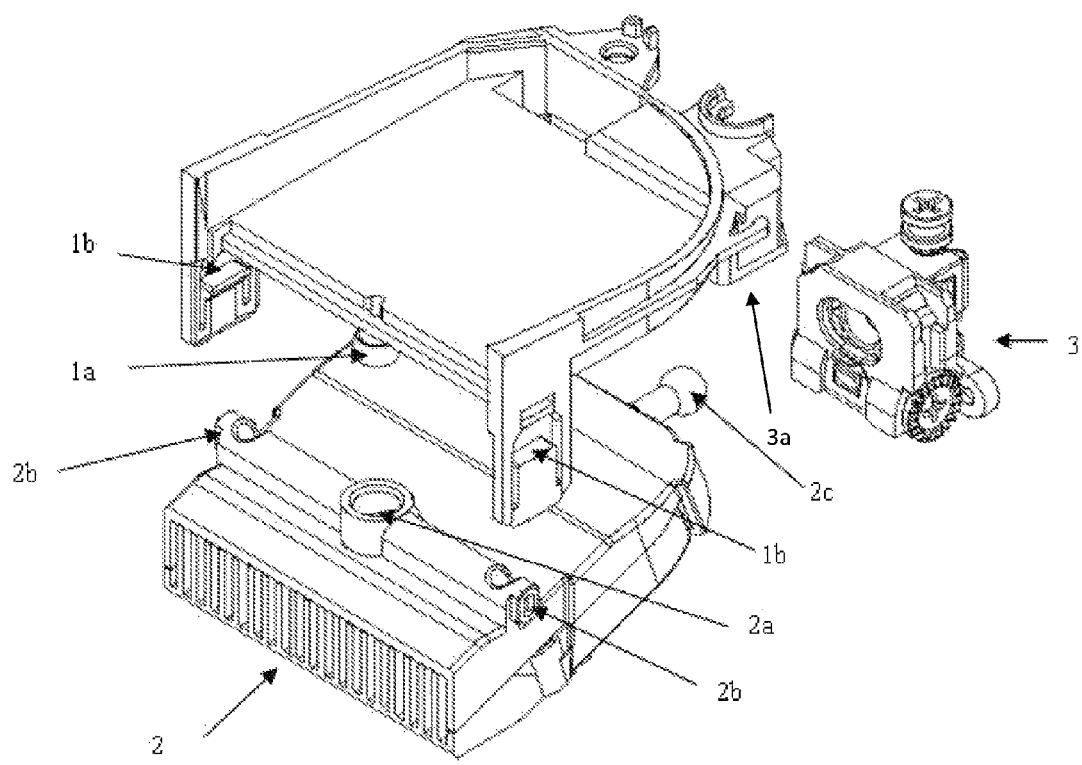
FIG. 2 is the segment diagram of the adjusting device in this invention.
Figure 3:
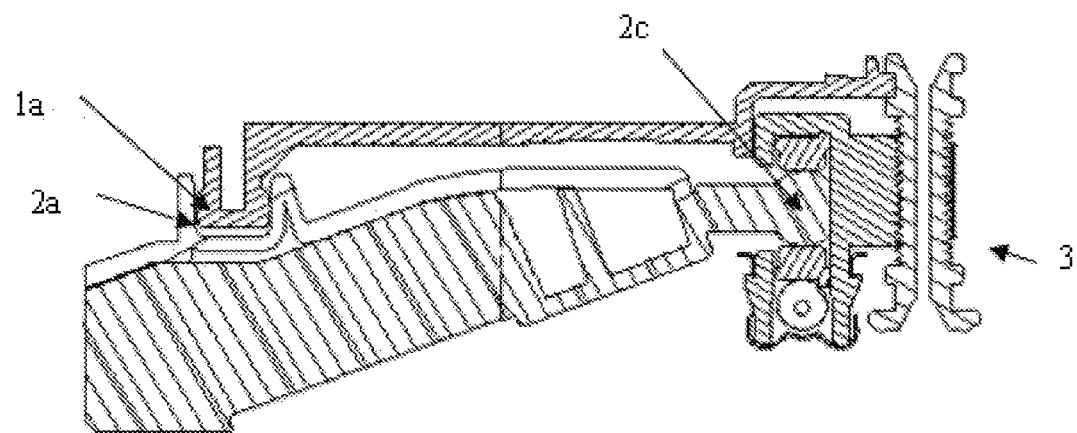
FIG. 3 is the sectional diagram of the adjusting device in this invention.

As shown in FIGS. 2 and 3, 1a is the fixed ball head, 1b is the elastic waist hole slot, 2a is the cylindrical inner hole, 2b is the guide post, 2c is the adjusting bar and 3a is the through hole.

On the one end of the adjusted assembly 2 is disposed the adjusting bar 2c, which is disposed horizontally or angled up by 15 to 20 degree relative to the horizontal plane. On the other side of the adjusted assembly 2 are fixedly disposed guide posts 2b each on both sides, between which the fixed ball head 1a is disposed. On the one end of fixed bracket 1 installed with the adjusted assembly 2, two elastic waist hole slots 1b are disposed fitted with the corresponding guide posts 2b, between which the cylindrical inner hole 2a is disposed fitted with the aforesaid fixed ball head 1a. With the top of two adjusting bars 2b respectively in the corresponding elastic waist hole slots 1b, the two elastic waist hole slots 1b respectively seize the two adjusting bar 2b, so as to restrict the adjusted assembly 2 from deviating along the rotation of cylindrical inner hole 2a. The aforesaid fixed ball head 1a in the cylindrical inner hole 2a restricts the adjusted assembly 2 from deviating along the radial direction of the cylindrical inner hole.

Restricted from the radical deviation by fitting the cylindrical inner hole 2a with the fixed ball head 1a, the adjusted assembly can rotate upward and downward within 3 degree taking the axial direction of the guide post as the rotation axis by fitting the guide post 2b with the elastic waist hole slot 1b. Restricted from the rotation deviation by fitting the guide post 2b with the elastic waist hole slot 1b, the adjusted assembly can rotate leftward and rightward within 3 degree taking the axial direction of the cylindrical inner hole 2a as the rotation axis by fitting the cylindrical inner hole 2a with the fixed ball head 1a.

The adjusting mechanism 3 is an up/down and left/right adjusting mechanism. On the one side of it, the through hole 3a is disposed fitted with the aforesaid adjusting bar 2c, of which the fitting end is spherical with the through hole 3a (cylindrical). Through the adjusting mechanism 3's adjustment to the aforesaid adjusting bar 2c, the adjusted assembly is driven to rotate upward, downward, leftward and rightward relative to the fixed bracket taking the axial direction of the guide post and cylindrical inner hole 2a as the rotation axis.

Figure 4:
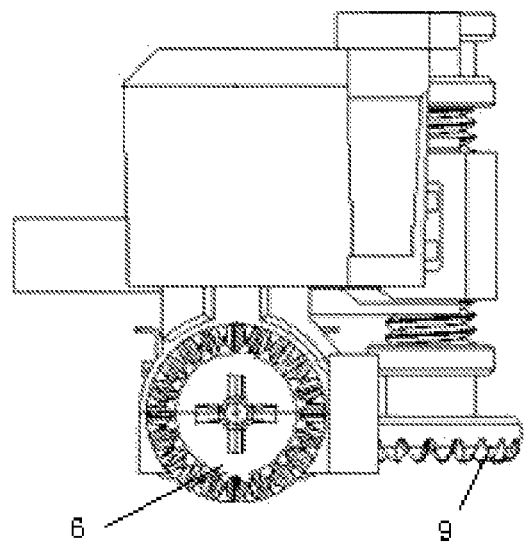
FIG. 4 is the front view of the thread-driven bi-directional adjusting structure.
Figure 5:
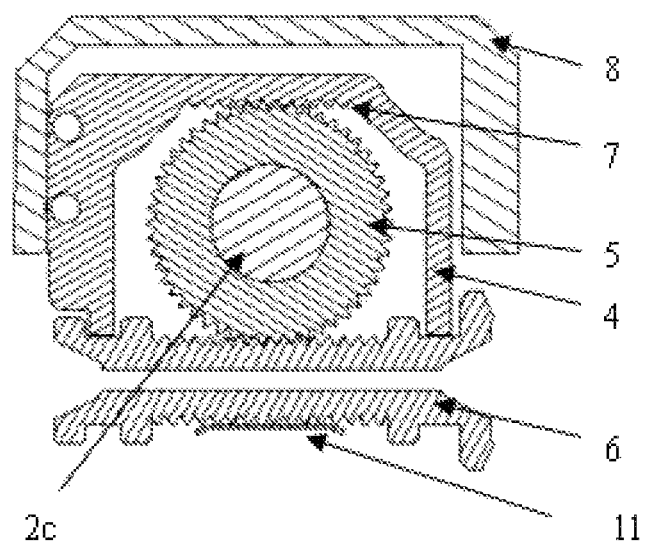
FIG. 5 is the A-A sectional diagram of the thread-driven bi-directional adjusting structure.
Figure 6:
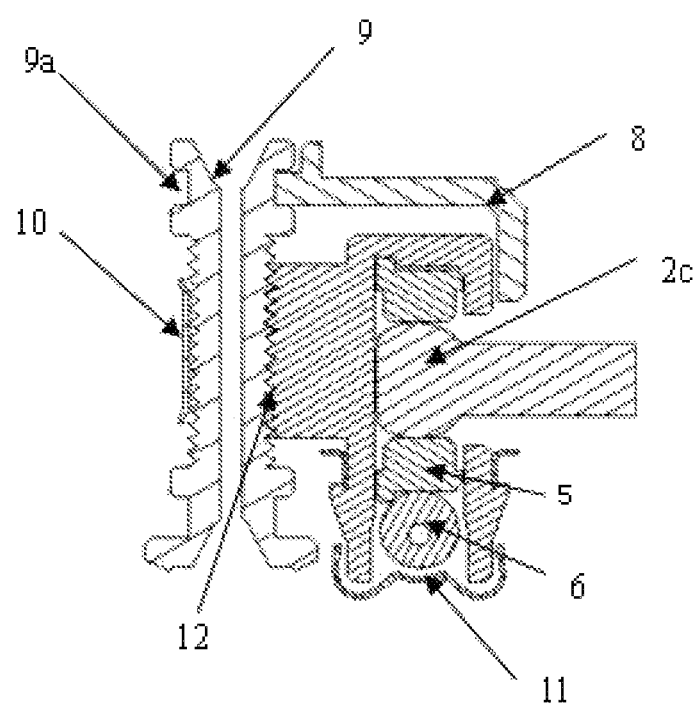
FIG. 6 is the B-B sectional diagram of the thread-driven bi-directional adjusting structure.

As shown in FIGS. 4 to 6, the up/down and left/right adjusting mechanism in this implementation is a thread-driven bi-directional adjusting mechanism. Thereinto, 4 is the sliding block, 5 is the gear, 6 is the left/right adjusting bolt, 7 is the rack structure, 8 is the sliding chute, 9 is the up/down adjusting bolt, 9a is the groove, 10 is the first clamp spring, 11 is the second clamp spring and 12 is the half-threaded structure.

The up/down and left/right adjusting mechanism comprises the sliding block 4 with cavity, the gear 5, the left/right adjusting bolt 6 and the up/down adjusting bolt 9. In the cavity of the aforesaid sliding block 4 is disposed the rack structure 7 meshing with one side of the aforesaid gear 5, of which the other side meshes with the left/right adjusting bolt 6 that is fixed with the sliding block 4 through the second clamp spring 11 and at the same time can rotate axially. By fitting the aforesaid through hole 3 disposed at the center of the gear 5 with the adjusting bar 2c, the left/right adjusting bolt 6 is adjusted forward or backward to drive the gear to roll leftward or rightward along the rack structure, during which the adjusting bar 2c is driven to move, so as to implement the leftward and rightward adjustment to the adjusted assembly 2 relative to fixed bracket 1.

On the aforesaid fixed bracket 1 is disposed the sliding chute 8 (vented-box) within that the sliding block 4 is disposed, on the one side of which the half-threaded structure 12 is disposed forming a thread pair with the up/down adjusting bolt 9 on the same side of the sliding block 4. Fixed with the sliding block 4 through the first clamp spring 10, the groove 9a on the top of the up/down adjusting bolt 9 cuts in the upper edge of the aforesaid sliding chute, making the up/down adjusting bolt 9 relatively axially fixed with the sliding chute 8. By fitting the aforesaid through hole 3 with the adjusting bar 2c, the up/down adjusting bolt 9 is adjusted forward or backward to drive the sliding block 4, the gear 5 and the left/right adjusting bolt 6 to move upward or downward in the sliding chute 8, during which the upward and downward movement of the gear 5 drives the adjusting bar 2c to move, so as to implement the upward and downward adjustment to the adjusted assembly 2 relative to fixed bracket 1.

In other implementations, the up/down and left/right adjusting mechanism may not be thread-driven as long as the up/down and left/right adjusting can be achieved.

The success of this invention is that the fit between the cylindrical inner hole 2a and the fixed ball head 1a together with the fit between the two elastic waist hole slots 1b and the two guide posts 2b form the rotation axis around which the adjusted assembly 2 rotates along the axial direction of the cylindrical inner hole 2a and the twp cylindrical guide posts 2b. Through the adjusting mechanism 3's adjustment to the adjusting bar 2c, the upward, downward, leftward and rightward adjustment to the adjusted assembly 2 is implemented relative to the fixed bracket 1.

Having a compact structure, this invention disposes the low beam unit on the fixed bracket 1 and the high beam unit on the adjusted assembly 2. The simultaneous adjustment to the high and low beam shapes is implemented by the adjusting mechanism 3's adjustment to the relative position of the high light of the beam shape of the high beam unit to the low beam shape and afterwards by adjusting the angle of the fixed bracket 1 and the lamp body. It solves the problem of the existing adjusting device that the high light of the high beam shape will deviate from the low beam shape after the beam angle of the low beam unit is adjusted, because the high beam unit and the low beam unit are disposed in different brackets and adjustment systems in the large-scale space.

What is claimed is:

1. A device for adjusting high and low beam shape of automotive headlamp,
  characterized in that:
  the device comprises a fixed bracket, an adjusted assembly and an adjusting mechanism, wherein the aforesaid fixed bracket is fixedly connected to a low beam unit and the aforesaid adjusted assembly is fixedly connected to a high beam unit;
  on one end of the aforesaid adjusted assembly is disposed an adjusting bar, and on the other end of the aforesaid adjusted assembly is disposed guide posts on both sides,
  between the two guide posts there sets a cylindrical inner hole;
  on the aforesaid fixed bracket is disposed elastic waist hole slots, which are fitted with the corresponding guide posts;
  between the two elastic waist hole slots is disposed a fixing ball head which is fitted with the cylindrical inner hole,
  when the ends of two guide posts are respectively in the corresponding elastic waist hole slots, the deviation of the adjusted assembly along the rotation of the cylindrical inner hole is restricted;
  when the fixing ball head is in the cylindrical inner hole, the deviation of the adjusted assembly along the radial direction of the cylindrical inner hole is restrained,
  the aforesaid adjusting mechanism is an up/down and left/right adjusting mechanism where on one side thereof a through hole fitted with a spherical end of the adjusting bar is disposed,
  through the adjustment of the adjusting mechanism to the adjusting bar, the adjusted assembly is driven to rotate upward, downward, leftward or rightward relative to the fixed bracket and around the center of sphere of the fixing ball head.

2. The device for adjusting high and low beam shapes of automotive headlamp as claimed in claim 1, characterized in that the up/down and left/right adjusting mechanism stated is a thread-driven bi-directional adjusting mechanism.

3. The device for adjusting high and low beam shape of automotive headlamp as claimed in claim 1, characterized in that each aforesaid guide post is cylindrical.

4. The device for adjusting high and low beam shapes of automotive headlamp as claimed in claim 1, characterized in that the aforesaid adjusting bar is disposed horizontally or is upward inclined relative to the horizontal plane.

5. The device for adjusting high and low beam shapes of automotive headlamp as claimed in claim 2, characterized in that the thread-driven bi-directional adjusting mechanism consists of a sliding block with cavity, a gear, an up/down adjusting bolt and a left/right adjusting bolt;
  in the cavity of the sliding block is disposed a rack structure meshing with one side of the gear, of which the other side meshes with the left/right bolt;
  with the aforesaid through hole set in the center of the gear, the left/right bolt is adjusted by fitting the through hole with the adjusting bar to drive the gear to roll along the rack structure, so as to implement the leftward and rightward adjustment of the adjusted assembly;
  on the aforesaid fixed bracket is disposed a sliding chute, within which is disposed the aforesaid sliding block;
  on one side of the sliding block is a half-threaded structure forming a thread pair together with the up/down adjusting bolt on the same side,
  on the top of which a groove cuts in the upper edge of the aforesaid sliding chute to make the up/down adjusting bolt relatively axially fixed with the sliding chute;
  the up/down adjusting bolt is adjusted by fitting the aforesaid through hole with the adjusting bar to drive the sliding block, gear and left/right adjusting bolt to move upward and downward in the sliding chute, so as to implement the upward and downward adjustment of the adjusted assembly.

6. The device for adjusting high and low beam shape of automotive headlamp as claimed in claim 5, characterized in that the aforesaid sliding chute is a vented-box sliding chute.

\* \* \* \* \*